(12) United States Patent
Vankamamidi et al.

(10) Patent No.: US 11,487,664 B1
(45) Date of Patent: Nov. 1, 2022

(54) PERFORMING DATA REDUCTION DURING HOST DATA INGEST

(71) Applicant: EMC IP Holding Company LLC, Hopkinton, MA (US)

(72) Inventors: Vamsi K. Vankamamidi, Hopkinton, MA (US); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/236,306

(22) Filed: Apr. 21, 2021

(51) Int. Cl.
*G06F 12/08* (2016.01)
*G06F 3/06* (2006.01)
*G06F 12/0804* (2016.01)
*G06F 12/0811* (2016.01)

(52) U.S. Cl.
CPC ........ *G06F 12/0804* (2013.01); *G06F 3/0608* (2013.01); *G06F 3/0641* (2013.01); *G06F 12/0811* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 9,569,357 B1 * | 2/2017 | Shalev | G06F 3/0641 |
| 10,180,792 B1 * | 1/2019 | Gaertner | G06F 11/1441 |
| 10,296,219 B2 | 5/2019 | Wang et al. | |
| 10,788,988 B1 | 9/2020 | Lary et al. | |
| 2010/0211616 A1 | 8/2010 | Khandelwal et al. | |
| 2011/0055471 A1 * | 3/2011 | Thatcher | G06F 3/0679 711/216 |
| 2011/0307447 A1 | 12/2011 | Sabaa et al. | |
| 2013/0318288 A1 * | 11/2013 | Khan | G06F 3/0679 711/103 |
| 2014/0304464 A1 * | 10/2014 | Bert | G06F 3/0688 711/105 |
| 2014/0359228 A1 * | 12/2014 | Hu | G06F 12/0871 711/136 |
| 2018/0067680 A1 * | 3/2018 | Ohtsuji | G06F 16/1752 |
| 2019/0042134 A1 | 2/2019 | Nishizono et al. | |
| 2020/0225868 A1 * | 7/2020 | Dalmatov | G06F 3/061 |

* cited by examiner

Primary Examiner — Kaushikkumar M Patel
(74) Attorney, Agent, or Firm — BainwoodHuang

(57) ABSTRACT

A technique performs data reduction on host data of a write request during ingest under certain circumstances. Therein, raw host data of a write request is placed from the host into a data cache. Further, a data reducing ingest operation is performed that reduces the raw host data from the data cache into reduced host data (e.g., via deduplication, compression, combinations thereof, etc.). After completion of the data reducing ingest operation, a late-binding operation is performed that updates a mapper with ability to access the reduced host data from secondary storage. Such ingest-time data reduction may be enabled/disabled (e.g., turned on or off) per input/output (I/O) operation (e.g., used only for relatively large asynchronous I/O operations) and/or activated in situations in which the ingest bandwidth is becoming a bottleneck.

20 Claims, 7 Drawing Sheets

PERFORMING DATA REDUCTION DURING HOST DATA INGEST

BACKGROUND

Data storage systems perform data storage operations on behalf of host computers. Such a data storage system may include storage processors (SPs), a logger formed from non-volatile random access memory (NVRAM), and back-end storage (e.g., solid state drive or SSD memory).

In response to receipt of a host write operation from a host computer, an SP receives host data within an SP cache, transfers the received host data from the SP cache (perhaps along with checksum data generated while the host data was in the SP cache) to the logger, and then notifies the host computer that the write operation has completed successfully. In the background, the SP then flushes the host data from the logger into the backend storage. During such flushing, the SP may perform deduplication and compression on the host data.

SUMMARY

Unfortunately, there may be deficiencies to the above-described data storage system that defers performing host data deduplication and compression until flushing the host data from the logger into backend storage. For example, since deduplication and compression are performed only after the host data is placed in the logger, the host data ingest bandwidth may be limited by the connecting bandwidth of the non-volatile random access memory (NVRAM) devices forming the logger. That is, the interconnection mechanism to the NVRAM devices (e.g., a PCIe bus leading to NVRAM devices) may become a bottleneck to the data storage system's ability to ingest host data from a host computer.

One way to improve the connecting bandwidth to the logger is to increase the number of NVRAM devices forming the logger. However, it may be expensive to provision the data storage system with additional NVRAM devices, and not all customers may require or desire a faster ingest rate.

Improved techniques are directed to performing data reduction on host data of a write request during ingest under certain circumstances. In particular, data reduction operations such as deduplication and/or compression may be performed on raw host data received in a data cache so that reduced host data rather than the raw host data is then further ingested. In some arrangements, a logger (e.g., built from NVRAM) which provides persistence to the data cache further ingests the reduced host data thus enabling the ingest bandwidth to exceed the connecting bandwidth limitations of the logger (e.g., under 4:1 data reduction, the ingest bandwidth may be four times greater than the connecting bandwidth of the logger). Additionally, in some arrangements (e.g., when logger bandwidth becomes a bottleneck), the reduced host data is written from the data cache directly into secondary storage thus bypassing the logger altogether. Such ingest-time data reduction and/or bypassing may be enabled/disabled (e.g., turned on/off) per input/output (I/O) operation (e.g., used only for relatively large asynchronous I/O operations) and/or activated in certain situations (e.g., when the logger bandwidth is becoming a bottleneck).

One embodiment is directed to a method of processing a set of write requests from a host which is performed within data storage equipment. The method includes placing raw host data of a write request from the host into a data cache. The method further includes performing a data reducing ingest operation that reduces the raw host data from the data cache into reduced host data. The method further includes, after completion of the data reducing ingest operation, performing a late-binding operation that updates a mapper with ability to access the reduced host data from secondary storage.

Another embodiment is directed to data storage equipment which includes memory, and control circuitry coupled to the memory. The memory stores instructions which, when carried out by the control circuitry, cause the control circuitry to perform a method of:
   (A) placing raw host data of the write request from the host into a data cache,
   (B) performing a data reducing ingest operation that reduces the raw host data from the data cache into reduced host data, and
   (C) after completion of the data reducing ingest operation, performing a late-binding operation that updates a mapper with ability to access the reduced host data from secondary storage.

Yet another embodiment is directed to a computer program product having a non-transitory computer readable medium which stores a set of instructions to process a write request from a host. The set of instructions, when carried out by computerized circuitry, causes the computerized circuitry to perform a method of:
   (A) placing raw host data of the write request from the host into a data cache;
   (B) performing a data reducing ingest operation that reduces the raw host data from the data cache into reduced host data; and
   (C) after completion of the data reducing ingest operation, performing a late-binding operation that updates a mapper with ability to access the reduced host data from secondary storage.

In some arrangements, the data storage equipment includes (i) storage processing circuitry having the data cache, (ii) a first storage tier of non-volatile random access memory (NVRAM), and (iii) a second storage tier of solid state drive (SSD) memory. Additionally, performing the data reducing ingest operation includes storing the reduced host data in at least one of the first storage tier and the second storage tier and acknowledging completion of the write request to the host.

In some arrangements, performing the late-binding operation includes transitioning host data access control to the mapper to enable the mapper to access the reduced host data from the second storage tier in response to a subsequent input/output (I/O) request.

It should be understood that such data reduction during host data ingest may be applied only under certain situations. In some arrangements, a set of policies may tune the application of such data reduction towards IOs were latency is less of a concern (e.g., an application that performs asynchronous writes).

In some arrangements, the method further includes:
   (A) placing other raw host data of another write request from the host into the data cache;
   (B) transferring the other raw host data from the data cache into the first storage tier and acknowledging completion of the other write request to the host; and
   (C) performing a flushing operation that (i) reduces the other raw host data from the first storage tier into other reduced host data using a set of data reduction operations, (ii) stores the other reduced host data in the second storage tier, and (iii) updates the mapper with ability to access the other reduced host data from the second storage tier.

For this other write request, data reduction during host data ingest is disabled so that traditional write request processing may proceed. Such disabling can be used for certain types of IOs such as synchronous writes and during times when the bandwidth of the first storage tier has substantial remaining capacity (e.g., NVRAM bandwidth is not a bottleneck).

In some arrangements, performing the data reducing ingest operation further includes, prior to storing the reduced host data, performing a set of data reduction operations on the raw host data to generate the reduced host data. The reduced host data consumes less storage space than the raw host data.

In some arrangements, performing the set of data reduction operations includes performing a set of deduplication operations on the raw host data to generate the reduced host data from the raw host data. Such arrangements may involve the application fingerprinting and certain hash algorithms.

In some arrangements, performing the set of data reduction operations includes performing a set of compression operations on the raw host data to generate the reduced host data from the raw host data. Such arrangements may involve utilization of a specialized compression tool (e.g., QAT compression).

In some arrangements, performing the set of data reduction operations includes:
(i) performing a set of deduplication operations on the raw host data to generate partially-reduced host data from the raw host data, and
(ii) performing a set of compression operations on the partially-reduced host data to generate the reduced host data from the partially-reduced host data.

It should be understood that other data reduction operations are suitable for use in place of, or in combination with, the above-mentioned arrangements as well.

In some arrangements, storing the reduced host data includes:
(i) writing the reduced host data from the data cache directly into the first storage tier of NVRAM when a current ingest bandwidth provided by the data storage equipment is below a predefined bandwidth threshold; and
(ii) writing the reduced host data from the data cache directly into the second storage tier of SSD memory to circumvent the first storage tier when the current ingest bandwidth provided by the data storage equipment is above the predefined bandwidth threshold.

In some arrangements, storing the reduced host data includes:
(i) writing the reduced host data from the data cache directly into the first storage tier of NVRAM when a size of the raw host data of the write request is less than a predefined size threshold; and
(ii) writing the reduced host data from the data cache directly into the second storage tier of SSD memory to circumvent the first storage tier when a size of the raw host data of the write request exceeds the predefined size threshold.

In some arrangements, storing the reduced host data includes:
(i) writing the reduced host data from the data cache directly into the first storage tier of NVRAM when the write request identifies a synchronous host write operation; and
(ii) writing the reduced host data from the data cache directly into the second storage tier of SSD memory to circumvent the first storage tier when the write request identifies an asynchronous host write operation.

In some arrangements, the reduced host data includes a set of compressed blocks generated by the data reducing ingest operation. Additionally, performing the late-binding operation further includes updating a mapping tree of the mapper to point to a set of locations within the second storage tier that contains the set of compressed blocks.

In some arrangements, the reduced host data includes provisional deduplication metadata generated by the data reducing ingest operation, the provisional deduplication metadata identifying a set of blocks of raw host data that has been deduplicated. Additionally, performing the late-binding operation further includes updating mapper deduplication metadata based on the provisional deduplication metadata to enable the mapper to access the set of blocks of raw host data that has been deduplicated.

In some arrangements, performing the late-binding operation further includes flushing a set of pages of the reduced host data from the first storage tier into the second storage tier. Along these lines, compressed unique blocks from pages associated with the write operation may be appended into a current flush's physical large block (PLB) in the second storage tier.

In some arrangements, performing the data reducing ingest operation includes storing the reduced host data in the first storage tier, the reduced host data being subsequently flushed from the first storage tier into the second storage tier during the late-binding operation. Additionally, the method further includes:
(i) placing other raw host data of another write request from the host into the data cache;
(ii) performing another data reducing ingest operation that reduces the other raw host data from the data cache into other reduced host data, the other reduced host data being stored directly into the second storage tier circumventing the first storage tier; and
(iii) after completion of the other data reducing ingest operation, performing another late-binding operation that updates the mapper with ability to access the other reduced host data from the second storage tier.

In some arrangements, performing the data reducing ingest operation includes storing the reduced host data directly into the second storage tier circumventing the first storage tier. Additionally, the method further includes:
(i) placing other raw host data of another write request from the host into the data cache;
(ii) performing another data reducing ingest operation that reduces the other raw host data from the data cache into other reduced host data, the other reduced host data being stored in the first storage tier; and
(iii) after completion of the other data reducing ingest operation, performing another late-binding operation that subsequently flushes the other reduced host data from the first storage tier into the second storage tier and updates the mapper with ability to access the other reduced host data from the second storage tier.

It should be understood that, in the cloud context, at least some electronic circuitry (e.g., hosts, backup sites, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, componentry, computer program products, and so on. Some embodiments are directed to various methods, electronic components and circuitry which are involved in performing data reduction on host data of a write request during ingest.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing data reduction on host data of a write request during ingest under certain circumstances. In particular, data reduction operations such as deduplication and/or compression may be performed on raw host data received in a data cache so that reduced host data rather than the raw host data is then further ingested. In some arrangements, a logger (e.g., built from NVRAM) which provides persistence to the data cache further ingests the reduced host data thus enabling the ingest bandwidth to exceed the connecting bandwidth limitations of the logger (e.g., under 4:1 data reduction, the ingest bandwidth may be four times greater than the connecting bandwidth of the logger). Additionally, in some arrangements (e.g., when logger bandwidth becomes a bottleneck), the reduced host data is written from the data cache directly into secondary storage thus bypassing the logger altogether. Such ingest-time data reduction and/or bypassing may be enabled/disabled (e.g., turned on/off) per input/output (I/O) operation (e.g., used only for relatively large asynchronous I/O operations) and/or activated in certain situations (e.g., when the logger bandwidth is becoming a bottleneck).

Figure 1:
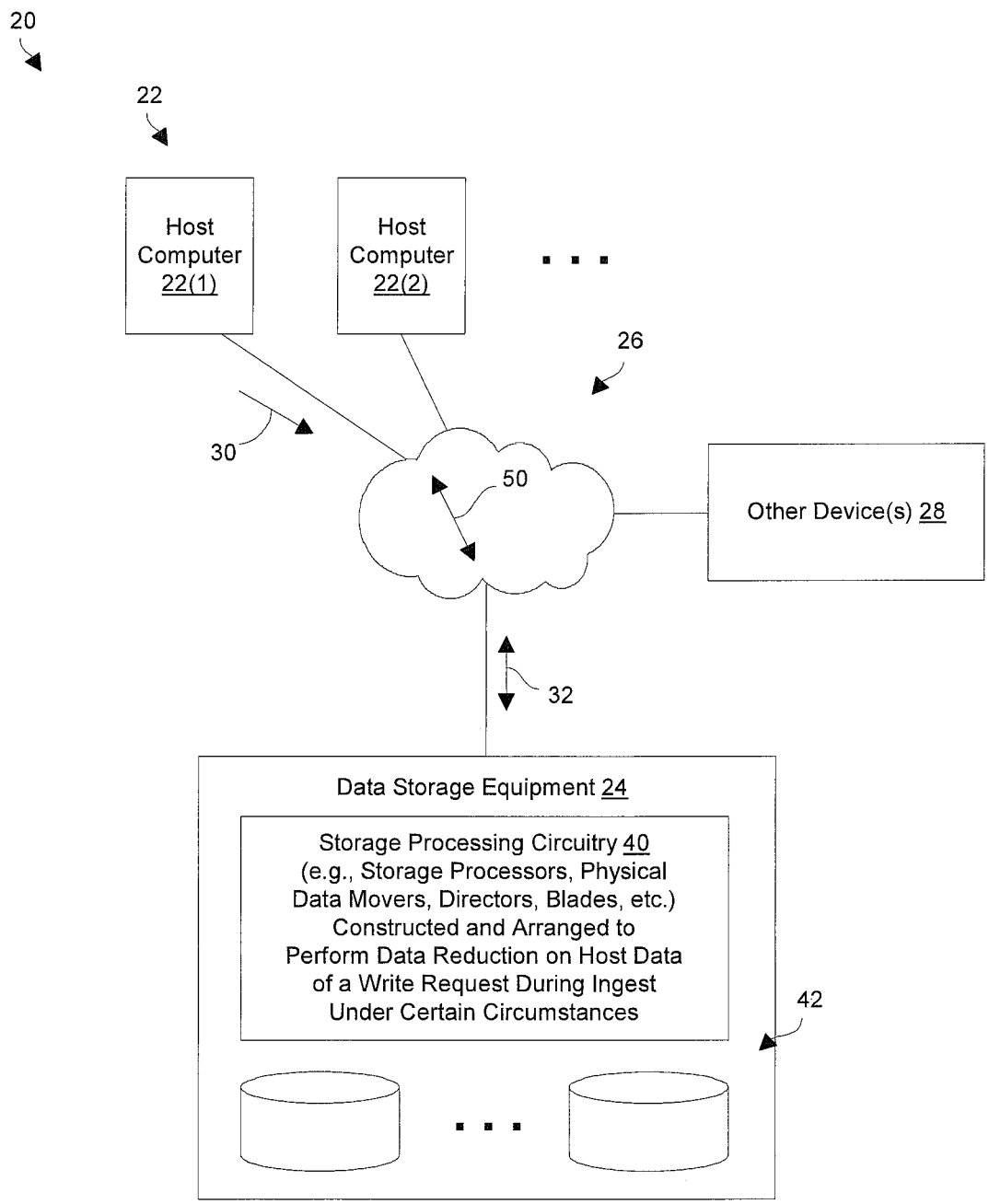
FIG. 1 is a block diagram of a data storage environment that performs data reduction on host data of a write request during ingest in accordance with certain embodiments.

FIG. 1 shows a data storage environment 20 which, under certain circumstances, performs data reduction on host data of a write request during ingest in accordance with certain embodiments. The data storage environment 20 includes host computers 22(1), 22(2), . . . (collectively, host computers 22), data storage equipment 24, a communications medium 26, and perhaps other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store host data 32 within and retrieve host data 32 from storage (e.g., primary storage or main memory, secondary storage, tiered storage, combinations thereof, etc.).

The data storage equipment 24 includes storage processing circuitry 40 and storage devices 42. The storage processing circuitry 40 is constructed and arranged to respond to the host I/O requests 30 from the host computers 22 by writing data into the storage devices 42 and reading the data from the storage devices 42. The storage processing circuitry 40 may include one or more storage processors (SPs) or engines, data movers, director boards, blades, I/O modules, storage device controllers, switches, other hardware, combinations thereof, and so on.

The storage devices 42 include different types of storage drives (e.g., NVRAM devices, SSDs, hard disk drives, combinations thereof, etc.). In some arrangements, NVRAM is used to build a logger which provides persistence to a front-end data cache within the storage processing circuitry 40. In particular, the logger may be implemented as log-structured storage that serves as an intermediate cache between the front-end data cache and secondary storage. In accordance with certain embodiments, the logger utilizes a mapped-RAID architecture.

Similarly, at least a portion of secondary storage may be SSD-based log-structured storage. In accordance with certain embodiments, the SSD-based log-structured storage utilizes a mapped-RAID architecture.

It should be appreciated that the storage processing circuitry 40 may provide a variety of specialized datapath services and data storage features such as garbage collection, tiering, deduplication, compression, encryption, snapshotting, backup/archival services, replication and/or failover to other data storage equipment, data recovery, and so on. As will be explained in further detail shortly, the storage processing circuitry 40 is able to ingest host data into the logger in a traditional manner, as well as ingest host data with data reduction into the logger under certain circumstances.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the data storage environment 20. Along these lines, the other devices 28 may include remote data storage equipment that provides data to and/or receives data from the data storage equipment 24 (e.g., replication arrays, backup and/or archiving equipment, service processors and/or management/control devices, etc.).

During operation, the storage processing circuitry 40 responds to write operations from the host computers 22 by transferring host data received in a front-end data cache (e.g., an SP buffer) to the logger and acknowledging the write operations. It should be appreciated that the host computers 22 may view a logical address space (e.g., 8 exabytes or EBs) which the data storage equipment 24 maps to a physical address space in secondary storage (e.g., via a mapper).

During normal operation, the storage processing circuitry 40 performs certain operations to safeguard the host data such as persisting the host data and generating checksums for the host data before the host data is placed into the logger. However, the storage processing circuitry 40 defers performing data reduction on the host data until flushing the host data from the logger into secondary (or backend) storage. That is, in the background and after the host data is place in the logger, the storage processing circuitry 40 flushes the host data from the logger to secondary storage and only then performs data reduction on the host data. In particular, during such flushing, the storage processing circuitry 40 performs deduplication and compression so that storing the host data takes up less space within secondary storage. Additionally, the storage processing circuitry 40 updates a mapper (e.g., by committing metadata transactions) so that access to the host data is no longer under cache control but now under mapper control for subsequent I/O operations.

In some situations, the storage processing circuitry 40 transitions from this normal operation to performing data reduction on host data during ingest. Such a transition to ingest-time data reduction prevents the connectivity bandwidth of the NVRAM devices from becoming a host data ingest bottleneck. The trigger for transitioning to ingest-time data reduction may be detection of a large asynchronous write operation where latency is less of a concern. Other situations may trigger such transitioning such as when bandwidth to the logger is becoming a bottleneck.

During ingest-time data reduction, raw host data is received into the front-end data cache of the storage processing circuitry 40. The storage processing circuitry 40 then performs data reduction on the raw host data to make the host data smaller before placing the reduced host data into the logger. Accordingly, there is less data placed in the logger and host data ingest is not bottlenecked by the connectivity bandwidth of the NVRAM devices.

In the background, the storage processing circuitry 40 then flushes the reduced host data from the logger into secondary storage. Here, data reduction does not need to be repeated thus saving overhead. It should be appreciated that the reduced host data is a combination of unique data in compressed format and metadata identifying deduplicated host data (e.g., counters and pointers referencing blocks of already stored data). Accordingly, the storage processing circuitry 40 performs a simpler late-binding procedure that moves the reduced host data into secondary storage and updates the mapper (e.g., modifies a mapping tree structure) so that the mapper is now in charge of providing access to the host data from secondary storage.

Moreover, in accordance with certain embodiments, the storage processing circuitry 40 may even circumvent (or bypass) the NVRAM devices altogether by writing the reduced host data directly into the secondary storage under certain conditions. In this situation, the late-binding procedure for the storage processing circuitry 40 simply involves updating the mapper in the background so that the mapper takes charge of providing access to the host data from secondary storage. Further details will now be provided with reference to FIG. 2.

Figure 2:
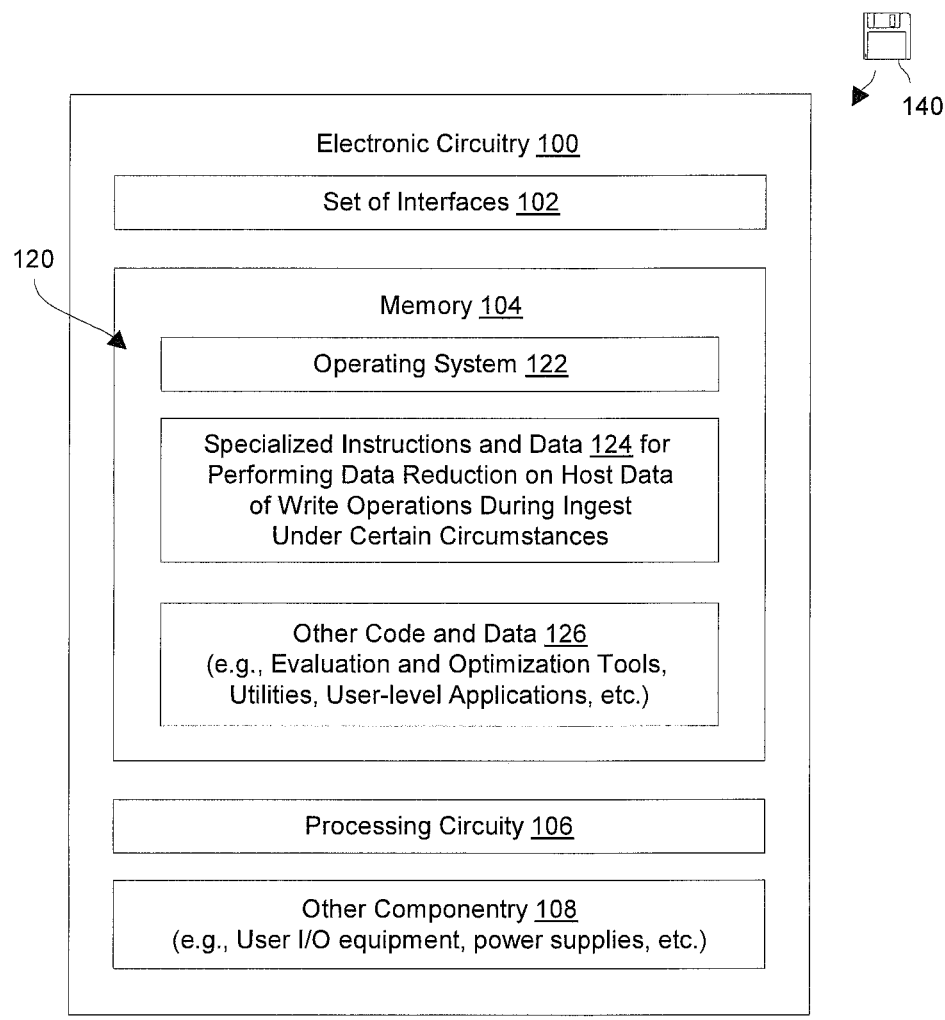
FIG. 2 is a block diagram of electronic circuitry which is suitable for use within the data storage environment in accordance with certain embodiments.

FIG. 2 shows electronic circuitry 100 which is suitable for use as at least a portion of the storage processing circuitry 40 in accordance with certain embodiments. The electronic circuitry 100 includes a set of interfaces 102, memory 104, and processing circuitry 106, and other circuitry (or componentry) 108.

The set of interfaces 102 is constructed and arranged to connect the electronic circuitry 100 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the set of interfaces 102 may include one or more host interfaces (e.g., a computer network interface, a fibre-channel interface, etc.), one or more storage device interfaces (e.g., a host adapter or HBA, etc.), and other interfaces. As a result, the set of interfaces 102 enables the electronic circuitry 100 to robustly and reliably communicate with other external apparatus.

The memory 104 is intended to represent both volatile storage (e.g., DRAM, SRAM, etc.) and non-volatile storage (e.g., flash memory, magnetic memory, etc.). The memory 104 stores a variety of software constructs 120 including an operating system 122, specialized instructions and data 124, and other code and data 126. The operating system 122 refers to particular control code such as a kernel to manage computerized resources (e.g., processor cycles, memory space, etc.), drivers (e.g., an I/O stack), and so on. The specialized instructions and data 124 refers to particular instructions for performing data reduction on host data of a write request during ingest under certain circumstances. In some arrangements, the specialized instructions and data 124 is tightly integrated with or part of the operating system 122 itself. The other code and data 126 refers to applications and routines to provide additional operations and services (e.g., performance measurement tools, etc.), user-level applications, administrative tools, utilities, and so on.

The processing circuitry 106 is constructed and arranged to operate in accordance with the various software constructs 120 stored in the memory 104. As will be explained in further detail shortly, the processing circuitry 106 executes the operating system 122 and the specialized code 124 to form specialized circuitry that robustly and reliably manages host data on behalf of a set of hosts (also see FIG. 1). Such processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on.

In the context of one or more processors executing software, a computer program product 140 is capable of delivering all or portions of the software constructs 120 to the electronic circuitry 100. In particular, the computer program product 140 has a non-transitory (or non-volatile) computer readable medium which stores a set of instructions that controls one or more operations of the electronic circuitry 100. Examples of suitable computer readable storage media include tangible articles of manufacture and apparatus which store instructions in a non-volatile manner such as DVD, CD-ROM, flash memory, disk memory, tape memory, and the like.

The other componentry 108 refers to other hardware of the electronic circuitry 100. Along these lines, the electronic circuitry 100 may include special user I/O equipment (e.g., a service processor), power supplies and battery backup units, auxiliary apparatuses, other specialized data storage componentry, etc.

It should be understood that the specialized circuitry formed by the processing circuitry 106 operating in accordance with the software constructs 120 monitors operation of the logger and, under certain circumstances, performs data reduction on host data of a write request during ingest. Such ingest-time data reduction prevents the logger from becoming a bottleneck.

It should be further understood that certain portions of the electronic circuitry 100 may reside together to form one or more storage controllers (or storage processors). In accordance with certain embodiments, the electronic circuitry 100 includes multiple storage controller devices for fault tolerance and/or load balancing purposes. Further details will now be provided with reference to FIGS. 3 and 4.

Figure 3:
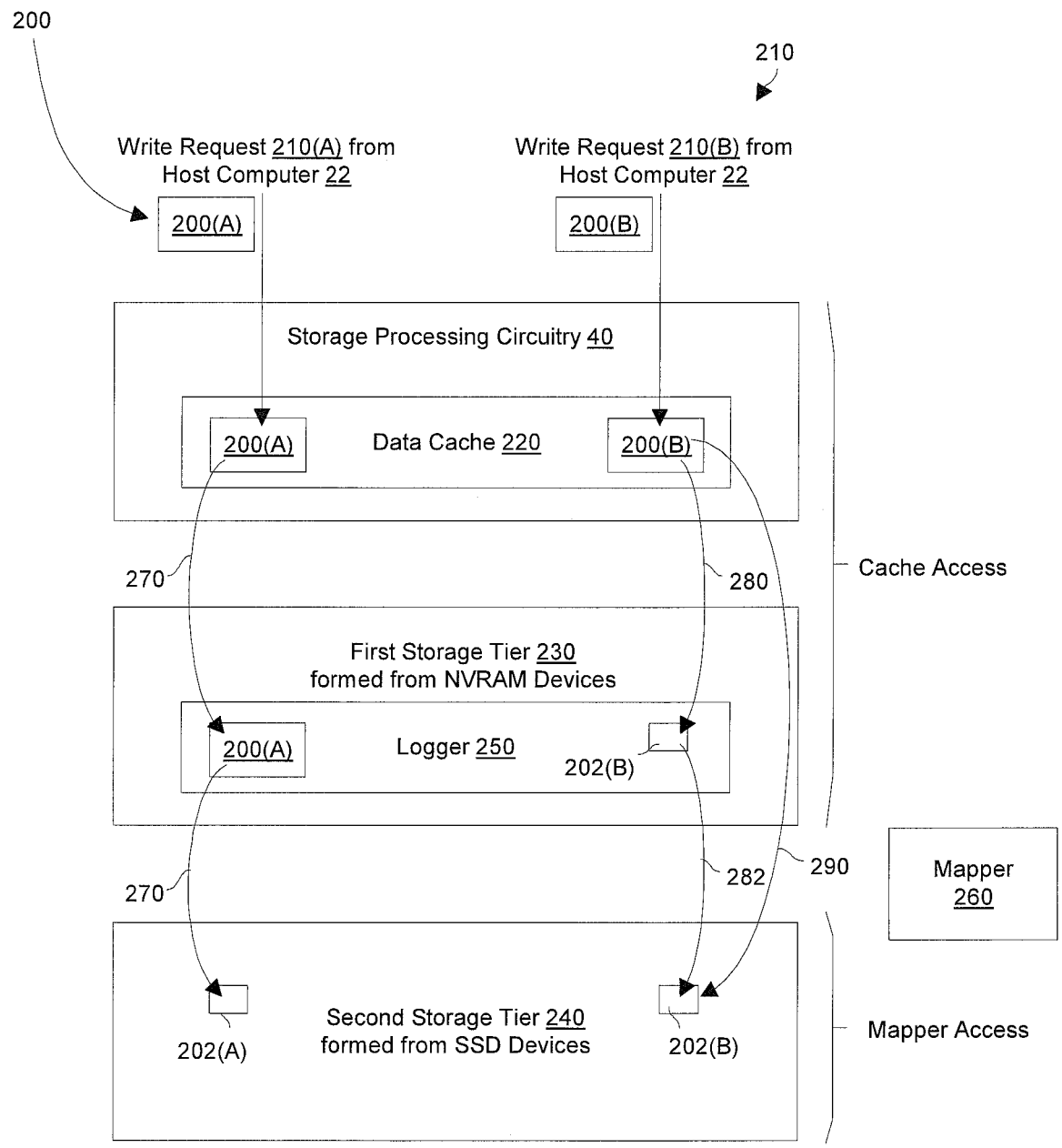
FIG. 3 is a block diagram illustrating certain storage details in accordance with certain embodiments.
Figure 4:
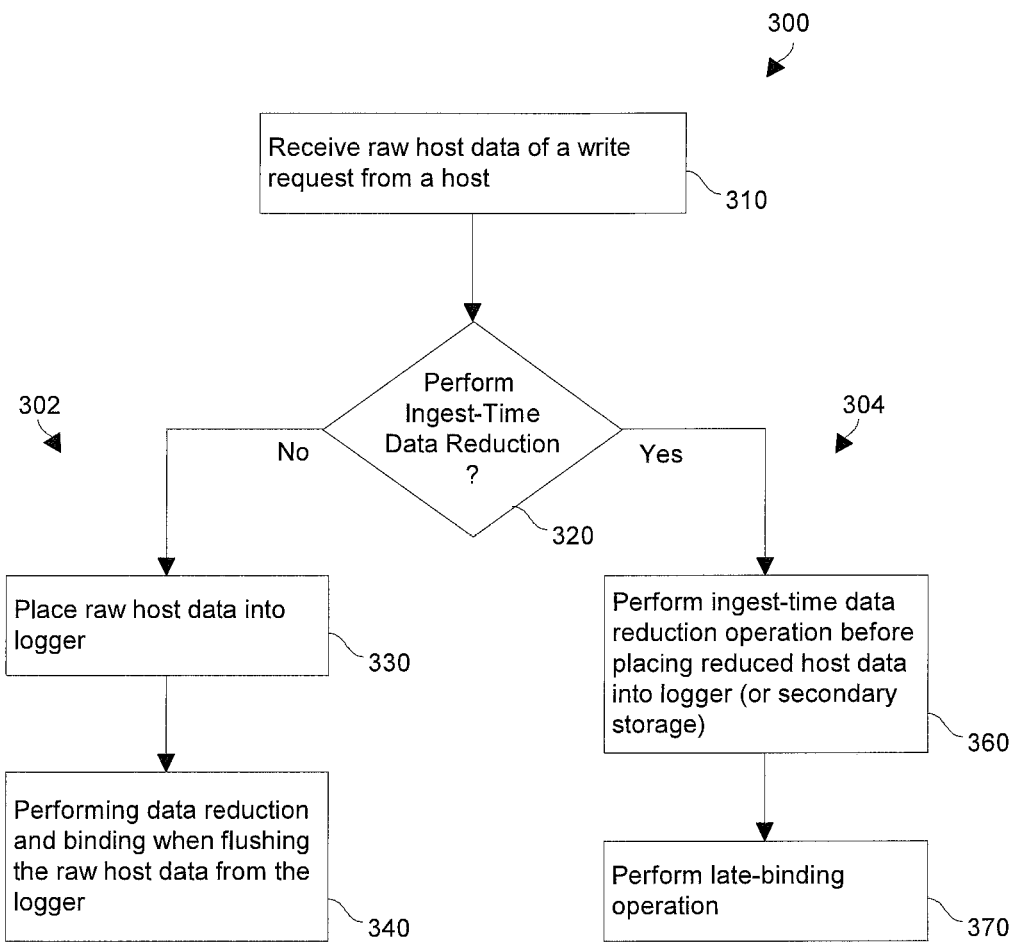
FIG. 4 is a flowchart illustrating certain operational details in accordance with certain embodiments.

FIGS. 3 and 4 show certain details of the data storage equipment 24. FIG. 3 shows certain storage details in accordance with certain embodiments. FIG. 4 shows certain operational details in accordance with certain embodiments.

With reference to FIG. 3, the data storage equipment 24 includes various storage locations for storing host data 200 from write requests 210 received from the host computers 22 (also see FIG. 1). In particular, the storage processing circuitry 40 (FIG. 1) includes a data cache 220 (e.g., persisted RAM) constructed and arranged to operate as a front-end cache. Additionally, the storage devices 42 includes a first storage tier 230 (e.g., NVRAM devices) constructed and arranged to operate as an intermediate cache and a second storage tier 240 (e.g., SSDs) constructed and arranged to operate as secondary storage.

The first storage tier 230 includes a logger 250 (i.e., log-structured storage) that enables host data 200 to be accessed under cache control (e.g., cache hits). The logger 250 provides persistence to the data cache 220. In some embodiments, the logger 250 uses a Redundant Array of Independent Disks (RAID) protection scheme (e.g., RAID1, RAID5, etc.). Such a logger 250 may be implemented using a mapped-RAID architecture.

The second storage tier 240 enables host data 200 to be accessed via a mapper 260 (e.g., an operating system component). Such a mapper 260 may include one or more tree structures (e.g., mapping trees) that enable the mapper to find where the host data 200 is located within secondary storage.

It should be understood that, in some arrangements, the secondary storage may be further tiered. For example, secondary storage may include tiers of different types of SSDs, tiers of SSDs and HDDs, tier of different types of HDDs, other media, combinations thereof, and so on.

FIG. 4 shows a procedure 300 which is performed by the storage processing circuitry 40 when storing the host data 200 of write requests 210 eventually into secondary storage in accordance with certain embodiments. The procedure 300 enables the storage processing circuitry 40 to selectively process write requests 210 in under a normal operating mode 302 or alternatively under an ingest-time data reduction mode 304 based on certain situations.

At 310 of the procedure 300, the storage processing circuitry 40 receives raw host data 200 of a write request 210 from a host computer 22. That is, the host data 200 is raw in that no data reduction has yet been performed on the host data 200.

It should be understood that such a write request 210 may be from a latency sensitive host application such as a synchronous write operation that requires fast acknowledgement, as illustrated in FIG. 3 by the write request 210(A) to write host data 200(A). Alternatively, such write requests 210 may be from a host application that is less latency sensitive such as an asynchronous write or a relatively large TO, as illustrated in FIG. 3 by the write request 210(B) to write host data 200(B).

At 320, the storage processing circuitry 40 decides whether to perform ingest-time data reduction on the raw host data 200 of the write request 210. Such a decision may be based on certain circumstances such as type of write request 210 (e.g., synchronous vs asynchronous), the amount (or size) of the host data 200 to be written, operating conditions of the storage processing circuitry 40 (e.g., percentage idle/busy of the logger 250), combinations thereof, and so on. In accordance with certain embodiments, the storage processing circuitry 40 may utilize a set of policies, rules, sensed criteria/status, settings, etc. to control and tune its operation when making this decision.

If the storage processing circuitry 40 decides not to perform ingest-time data reduction, 320 proceeds to 330. For example, when processing the write request 210(A), the storage processing circuitry 40 decides to proceed under the normal operating mode 302 rather than perform ingest-time data reduction on the raw host data 200(A) and thus proceeds to 330.

At 330, the storage processing circuitry 40 places the raw host data 200(A) into the logger 250 of the first storage tier 230 (arrow 270 in FIG. 3). At this point, the storage processing circuitry 40 may acknowledge completion of the write request 210(A) back to the host computer 22. Accordingly, if there is a subsequent request for the same host data 200, the storage processing circuitry 40 accesses the raw host data 200(A) from the logger 250 (e.g., a cache hit).

At 340, the storage processing circuitry 40 then performs a flush operation that generates reduced host data 202(A) from the raw host data 200(A), and stores the reduced host data 200(A) in the second storage tier 240 (arrow 272 in FIG. 3). Additionally, the flush operation updates the mapper 260 to enable the reduced host data 202(A) to be retrieved from the second storage tier 240. That is, host data access control transitions to the mapper 260 to enable the mapper 260 to access the reduced host data 202(A) from secondary storage in response to a subsequent I/O request (e.g., via a cache miss).

However, at 320, if the storage processing circuitry 40 decides to perform ingest-time data reduction, 320 proceeds to 360. For example, when processing the write request 210(B), the storage processing circuitry 40 decides to proceed under the ingest-time data reduction mode 304 and thus proceeds to 360.

At 360, the storage processing circuitry 40 performs an ingest-time data reduction operation that generates reduced host data 202(B) from the raw host data 200(B), and stores the reduced host data 202(B) in the logger 250 (arrow 280 in FIG. 3). At this point, the storage processing circuitry 40 may acknowledge completion of the write request 210(B) back to the host computer 22. Accordingly, if there is a subsequent request for the same host data 200, the storage processing circuitry 40 accesses the reduced host data 202(B) from the logger 250 (e.g., a cache hit).

At 370, the storage processing circuitry 40 then performs a late-binding operation that moves the reduced host data 202(B) from the logger 250 into the second storage tier 240 (arrow 282 in FIG. 3). Additionally, the late-binding operation updates the mapper 260 to enable the reduced host data 202(B) to be retrieved from the second storage tier 240 in response to a subsequent I/O request (e.g., via a cache miss). It should be appreciated that, since data reduction was performed during ingest-time, it is unnecessary to repeat data reduction when moving the reduced host data 202(B) from the logger into the second storage tier 240. Rather, the storage processing circuitry 40 simply commits certain changes to the mapper 260 (e.g., updating metadata) to enable subsequent access from secondary storage.

It should be understood that since the ingest-time data reduction mode 304 reduces the amount of data to the logger 250, the host data ingest bandwidth may exceed the connection bandwidth to the logger 250. For example, a 4:1 data reduction ratio may translate to potentially four times greater ingest bandwidth. Other data reduction ratios are achievable as well.

It should be further understood that, in accordance with certain embodiments, the logger 250 is bypassed when the storage processing circuitry 40 operates in the ingest-time data reduction mode 304. Here, the storage processing circuitry 40 generates reduced host data 202(B) from the raw host data 200(B), but writes the reduced host data 202(B) directly into the second storage tier 240, e.g., SSDs (arrow 290 in FIG. 3). In these embodiments, late-binding operation simply updates the mapper 260 to enable the reduced host data 202(B) to be retrieved from the second storage tier 240 in response to a subsequent I/O request (e.g., via a cache miss). Further details will now be provided with reference to FIGS. 5 through 7.

Figure 5:
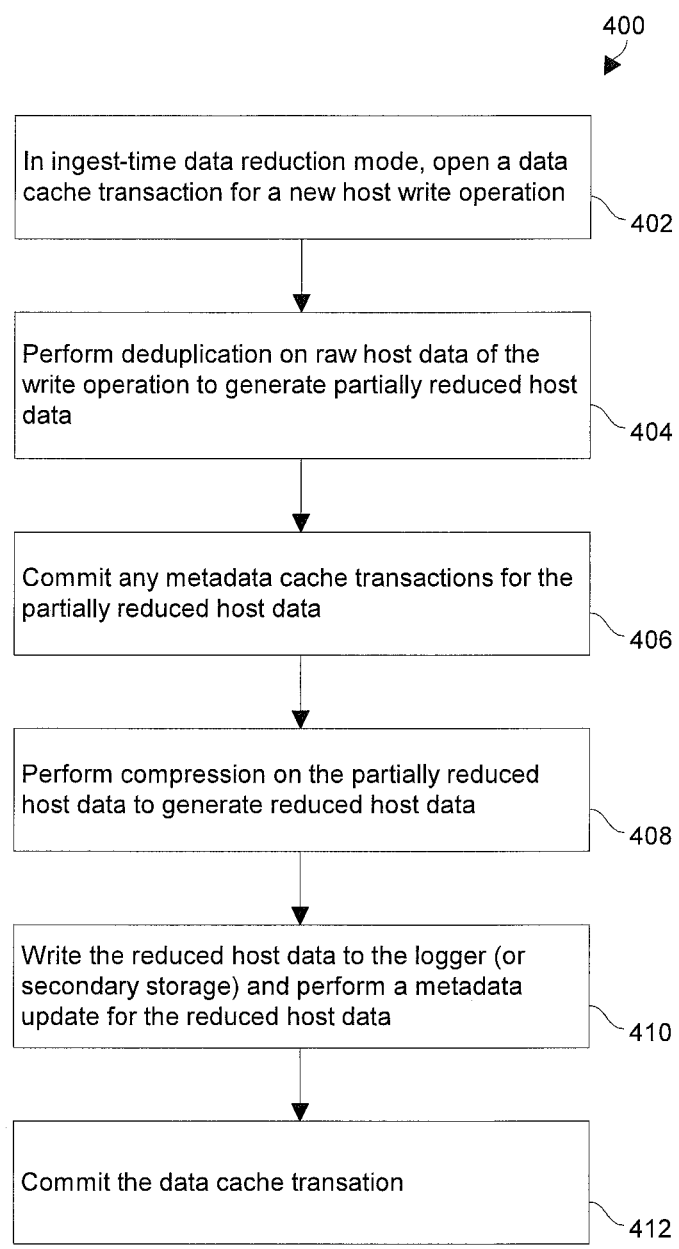
FIG. 5 is a flowchart for write flow which is performed by a data storage environment in accordance with certain embodiments.
Figure 6:
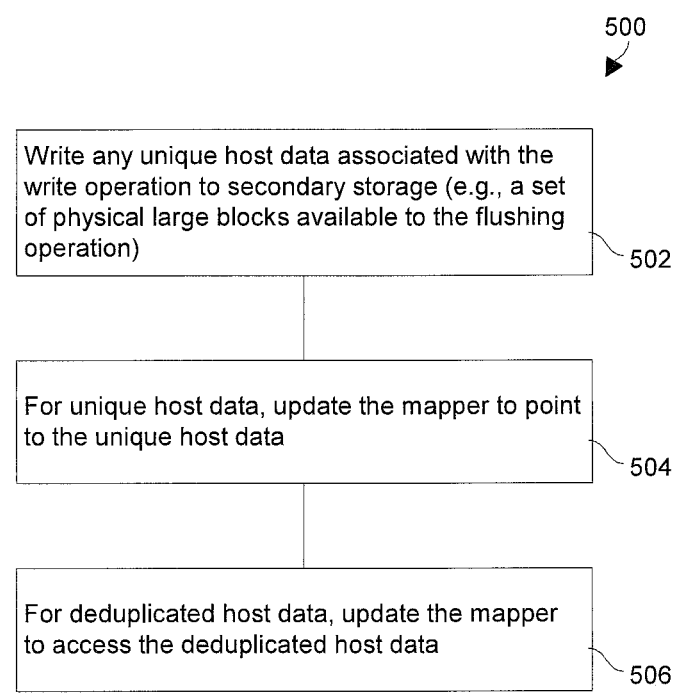
FIG. 6 is a flowchart for late binding which is performed by a data storage environment in accordance with certain embodiments.
Figure 7:
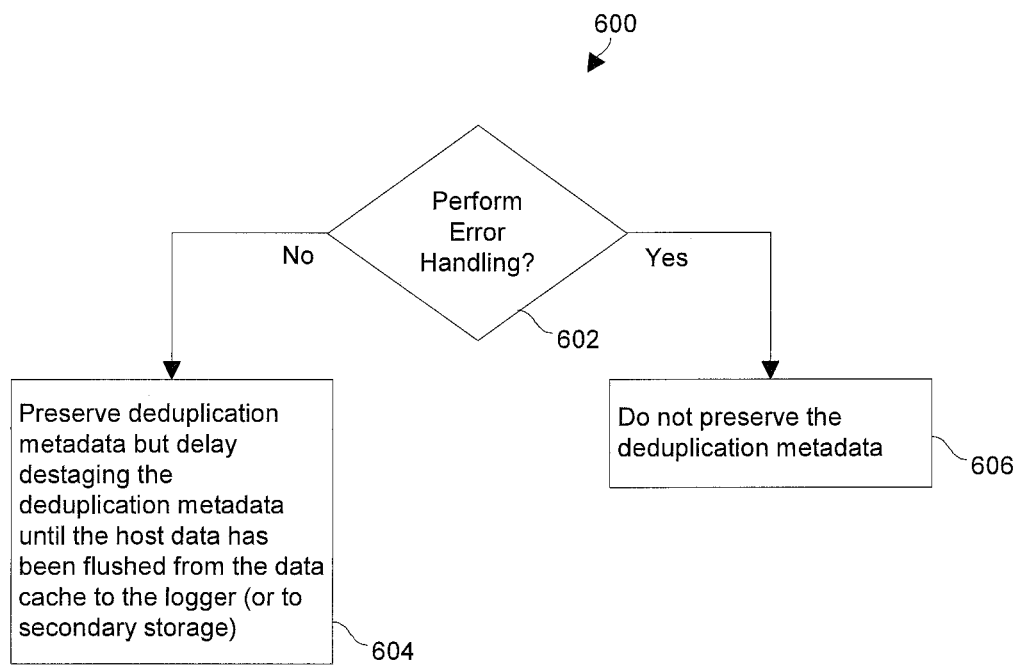
FIG. 7 is a flowchart for certain error handling which is performed by a data storage environment in accordance with certain embodiments.

FIGS. 5 through 7 provide further operational details for above-mentioned ingest-time data reduction mode 304 in accordance with certain embodiments. FIG. 5 shows a write flow procedure 400 which is performed in accordance with certain embodiments. FIG. 6 shows a late binding procedure 500 which is performed in accordance with certain embodiments. FIG. 7 shows a certain error handling procedure 600 which is performed in accordance with certain embodiments.

With reference to FIG. 5, the storage processing circuitry 40 performs the write flow procedure 400 when processing a write request in ingest-time data reduction mode. Such a procedure 400 is suitable for all or at least part of the activity 360 in FIG. 4 in accordance with certain embodiments.

At 402, the storage processing circuitry 40 opens a data cache transaction for a new host write operation (also see the write operation 210(B) in FIG. 3). Such a transaction may involves accessing certain operating system resources to persist and track the raw host data while the host data is further processed en route to the logger.

At 404, the storage processing circuitry 40 performs deduplication on the raw host data of the write operation to generate partially reduced host data. In particular, the storage processing circuitry 40 copies the raw host data from kernel buffers to the data cache, calculates a set of checksums for the raw host data (e.g., error detection and/or error correction codes), and computes a set of fingerprints for the raw host data (e.g., hash values to identify potential duplicate 4K blocks already stored within the data storage equipment 24). It should be appreciated that, in the normal operating mode 302, the storage processing circuitry 40 also accesses raw host data to calculate checksum too so it is convenient to perform the additional fingerprinting at this stage as well. If there are any fingerprint hits (i.e., matches), the storage processing circuitry 40 opens a metadata transaction and performs an in-depth evaluation (e.g., a byte-by-byte comparison, a deep crypto-hash, combinations thereof, etc.) to determine whether there is an exact match.

At 406, the storage processing circuitry 40 updates a metadata cache to reflect any deduplications, i.e., any discovered exact matches. In particular, the storage processing circuitry 40 updates reference counters to blocks that are shared by multiple storage objects as well as saves the data cache transaction identifier for this update.

At 408, the storage processing circuitry 40 performs compression on the partially reduced host data (e.g., remaining non-deduplicated blocks). In some embodiments, a specialized compression tool of the storage processing circuitry 40 processes the partially reduced host data (e.g., QAT compression).

At 410, the storage processing circuitry 40 writes the resulting reduced host data to the logger (e.g., see arrow 280 in FIG. 3) and updates the metadata cache. Accordingly, the storage processing circuitry 40 writes, as the reduced host data, unique compressed blocks to the logger. For example, if deduplication results in 2:1 reduction and compression results in 2:1 reduction, the overall data reduction is 4:1 thus consuming only a quarter of the ingest bandwidth to the logger that would have otherwise been consumed under the normal operating mode. Other reduction ratios for deduplication and/or compression may result in a different overall reduction ratio which is also suitable for use.

At 412, the storage processing circuitry 40 commits the changes of the data cache transaction. At this point, the storage processing circuitry 40 may acknowledge completion of the write operation to the host computer, and a subsequent IO on the host data will result in a cache hit.

As mentioned earlier in connection with FIGS. 3 and 4, in accordance with certain embodiments, the storage processing circuitry 40 writes the reduced host data directly to secondary storage (e.g., see arrow 290 in FIG. 3) rather than to the logger. Here, there are physical large blocks (PLBs) that are available to receive host data flushed from the logger. The storage processing circuitry 40 writes the reduced host data directly to the same PLBs while bypassing the logger. In these situations, 410 and 412 are generally the same as for writing to the logger except that the metadata reflects writing the reduced data to secondary storage.

With reference to FIG. 6, the storage processing circuitry 40 performs, in the background, the late-binding procedure 500 to update the mapper 260. That is, the storage processing circuitry 40 transitions from cache control over the reduced host data to mapper control.

At 502, the storage processing circuitry 40 writes any unique compressed host data associated with the write operation from the logger to secondary storage (e.g., see arrow 282 in FIG. 3). That is, the storage processing circuitry 40 flushes any pages containing reduced host data of the write operation to the PLB that is receiving new host data from the logger.

At 504, the storage processing circuitry 40 updates the mapper 260 to point to the unique compressed host data in secondary storage.

At 506, the storage processing circuitry 40 updates the mapper 260 to access deduplicated host data.

It should be understood that since data reduction occurred during ingest, further data reduction of the host data is unnecessary during this procedure 500. At this point, a request for the host data results in a cache miss and the mapper 260 retrieves the host data from secondary storage.

With reference to FIG. 7, the storage processing circuitry 40 performs a procedure 600 for error handling purposes in accordance with certain embodiments. The procedure 600 may prevent updating certain deduplication metadata under certain situations (also see FIG. 5).

At 602, when it is time to perform the metadata update (see 410 in FIG. 5), the storage processing circuitry 40 evaluates the status of the data cache. In particular, in some embodiments, the data cache uses log-structured storage to store the raw host data and under certain situations, the position of the log's tail may make the metadata unreliable. If such a situation exists, 602 proceeds to 604. Otherwise, 602 proceeds to 606.

At 604, if the host data has not yet been flushed from the data cache to the logger, the storage processing circuitry 40 delays destaging the metadata until the host data has been flushed. Here, the storage processing circuitry 40 simply waits until the host data has been flushed.

At 606, the storage processing circuitry 40 does not preserve the deduplication metadata. Such dropping of the deduplication metadata addresses a potential problematic situation such as a node panic.

As described above, improved techniques are directed to performing data reduction on host data 200 of a write request 210 during ingest under certain circumstances. In particular, data reduction operations such as deduplication and/or compression may be performed on raw host data 200 received in a data cache 220 so that reduced host data 202 rather than the raw host data 200 is then further ingested. In some arrangements, a logger 250 further ingests the reduced host data 202 thus enabling the ingest bandwidth to exceed the connecting bandwidth limitations of the storage from which the logger was built (e.g., under 4:1 data reduction, the ingest bandwidth may be four times greater than the connecting bandwidth). Additionally, in some arrangements, characteristics of the write request 210 may identify a bypass situation in which the reduced host data 202 is written directly into secondary storage 240 thus bypassing the logger altogether. Such ingest-time data reduction and/or bypassing may be enabled/disabled (e.g., turned on/off) per input/output (I/O) operation (e.g., used only for relatively large asynchronous I/O operations) and/or activated in situations in which the bandwidth of the logger storage is becoming a bottleneck.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as one or more host computers 22 and/or one or more other devices 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be understood that, in former approaches, there is no data reduction of host data performed prior to flushing the host data from cache into secondary storage. That is, data reduction occurs during late-binding and/or as a background operation (i.e., when the host data is written from cache to secondary storage and then accessed via the mapper rather than cache).

In contrast to the former approaches and in accordance with certain embodiments, data reduction is performed as part of ingest so that only unique data in compressed format is written to a logger (e.g., log-structured storage implemented in NVRAM). For example, with such techniques it is possible to only have to write 6 GB/s into the logger for 24 GB/s of ingest bandwidth assuming 4:1 data reduction. In such a situation, there is no other bottleneck (e.g., no CPU bottleneck). With data reduction performed during data-ingest, the costly operations of data reduction do not need to be repeated when doing late-binding later-on.

It should be understood that, in accordance with certain embodiments, only deduplication is performed during ingest-write. In such embodiments, compression is performed during late-binding.

In accordance with other embodiments, only compression is performed during ingest-write. Here, deduplication is performed during late-binding.

Since performing data reduction at ingest time may add latency to those host write operations, ingest-time data reduction may be performed only during certain situations. For example, ingest-time data reduction may be applied only when the bandwidth of the logger (or other caching device) is becoming a bottleneck. As another example, ingest-time data reduction may be applied only to large IOs where latency is less of a concern (such as application's asynchronous writes). Such enabling and disabling of ingest-time data reduction may be controlled by a set of policies that tune the operation of the data storage equipment.

One should appreciate that ingest write-bandwidth of certain data storage equipment may be limited by the connectivity of its NVRAM caching device which may be about 3 GB/s for implementations that use one pair of NVRAM devices, and about 6 GB/s for implementations that use two pairs of NVRAM devices. As a result, the ingest write-bandwidth may be lower than other data storage equipment which can achieve in excess of 10 GB/s. Having a lower ingest write-bandwidth may then impact the ability to support some customer applications, workloads, and certification processes.

However, certain improvements disclosed herein prevent ingest write-bandwidth bottlenecking and/or other NVRAM caching device limitations from restricting throughout. Rather, in accordance with certain embodiments, ingest-time data reduction may be performed thus enabling ingest write-bandwidth to greatly exceed NVRAM caching device connectivity limitations.

In accordance with certain embodiments, write flow to achieve ingest-time data reduction for a new host write-operation is performed as follows:
1. Open DataCache Transaction (Tx) for the new host write-operation
2. When copying the data from kernel-buffers to cache-buffer, overload the assembly routine which calculates checksum to also calculate fingerprint for each 4k block.
3. Look-up the fingerprint cache to see if any of the 4k blocks are a cache-hit.
4. If yes, open Metadata Cache Transaction (MdCache Tx)

5. For every 4k block that is fingerprint cache-hit
    a. Read the 4k block from the backend and perform byte-compare with 4k block in write operation. Alternatively, if a crypto-hash is maintained for each unique block in the system, load it to compare with the crypto-hash of 4k block in write-operation.
    b. If compare is successful, perform MDL (metadata cache) update for "provisional" reference-count increment on the matching Virtual
        i. In the MDL update, include DataCache TxID (seq-id) to associate the "provisional" ref-cnt increment with the host write-operation.
6. Commit MdCacheTx
7. For blocks that are unique, use QAT compression to compress.
8. Write compressed unique blocks to logger's page-buffers
9. In associated logger's page-descriptor
    a. for 4k blocks which are deduped, persist their associated virtuals
    b. for blocks that are unique, persist their offset and length in page-buffers
10. Commit DataCacheTx In accordance with certain embodiments, late-binding flow is as follows:
1. When flushing pages associated with the above write-operation, append the compressed unique blocks directly into the flush's PLB.
2. For unique data, update mapping to point to compressed blocks in the PLB
3. For deduped data
    a. update mapping to point to the virtuals persisted in Logger page-descriptor.
    b. perform MDL update operation to make "provisional" ref-cnt increment on the virtuals permanent.

In accordance with certain embodiments, metadata cache destage flow is as follows:
1. When it is time to destage a VLB which has "provisional" ref-cnt increment
    a. Check if DataCache Log's tail has moved past the seq-id associated with the "provisional" ref-cnt increment
        i. If no, continue to maintain the delta for "provisonal" ref-cnt increment even after destage of the VLB or delay the destage
        ii. If yes, drop the provisional ref-cnt increment. This is the case where MDCacheTx commit (step-6 of write-flow) was successful but DataCacheTx commit (step-10 of write-flow) failed for example due to node panic.

In the above-described metadata cache destage flow process, "provisional" ref-cnt increment is introduced to handle the failure case where MdCache Tx commit is successful but DataCache Tx commit is unsuccessful during the write-flow described above.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

For example, in accordance with certain embodiments the logger was described above as being implemented using NVRAM devices. Such NVRAM devices may be accessed through a Peripheral Component Interconnect Express (PCIs) bus. However, other interconnection mechanisms, busses, devices, etc. may be used as well. Such modifications and enhancements are intended to belong to various embodiments of the disclosure.

What is claimed is:

1. Within data storage equipment, a method of processing a set of write requests from a host, the method comprising:
    placing raw host data of the set of write requests from the host into a data cache;
    performing a data reducing ingest operation that reduces the raw host data from the data cache into reduced host data; and
    after completion of the data reducing ingest operation, performing a late-binding operation that updates a mapper with ability to access the reduced host data from secondary storage;
    wherein the raw host data includes first host data from a first host write operation and second host data from a second host write operation; and
    wherein performing the data reducing ingest operation includes:
        reducing the first host data into first reduced data based on a first latency indication of the first host write operation indicating that the first host write operation is not latency sensitive, and storing the first reduced data in a logger of the data storage equipment, and
        not reducing the second host data based on a second latency indication of the second host write operation indicating that the second host write operation is latency sensitive, and storing the second host data that is not reduced based on the second latency indication in the logger of the data storage equipment.

2. A method as in claim 1 wherein the data storage equipment includes (i) storage processing circuitry having the data cache, (ii) a first storage tier of non-volatile random access memory (NVRAM), at least a portion of which forms the logger, and (iii) a second storage tier of solid state drive (SSD) memory; and
    wherein performing the data reducing ingest operation includes:
        storing the reduced host data in at least one of the first storage tier and the second storage tier and acknowledging completion of the write request to the host.

3. A method as in claim 2 wherein performing the late-binding operation includes:
    transitioning host data access control to the mapper to enable the mapper to access the reduced host data from the second storage tier in response to a subsequent input/output (I/O) request.

4. A method as in claim 3 wherein performing the data reducing ingest operation further includes:
    prior to storing the reduced host data, performing a set of data reduction operations on the raw host data to generate the reduced host data, the reduced host data consuming less storage space than the raw host data.

5. A method as in claim 4 wherein performing the set of data reduction operations includes:
    performing a set of deduplication operations on the raw host data to generate the reduced host data from the raw host data.

6. A method as in claim 4 wherein performing the set of data reduction operations includes:

performing a set of compression operations on the raw host data to generate the reduced host data from the raw host data.

7. A method as in claim 4 wherein performing the set of data reduction operations includes:
performing a set of deduplication operations on the raw host data to generate partially-reduced host data from the raw host data, and
performing a set of compression operations on the partially-reduced host data to generate the reduced host data from the partially-reduced host data.

8. A method as in claim 3 wherein storing the reduced host data includes:
writing the reduced host data from the data cache directly into the first storage tier of NVRAM when a current ingest bandwidth provided by the data storage equipment is below a predefined bandwidth threshold; and
writing the reduced host data from the data cache directly into the second storage tier of SSD memory to circumvent the first storage tier when the current ingest bandwidth provided by the data storage equipment is above the predefined bandwidth threshold.

9. A method as in claim 3 wherein storing the reduced host data includes:
writing the reduced host data from the data cache directly into the first storage tier of NVRAM when a size of the raw host data of the write request is less than a predefined size threshold; and
writing the reduced host data from the data cache directly into the second storage tier of SSD memory to circumvent the first storage tier when a size of the raw host data of the write request exceeds the predefined size threshold.

10. A method as in claim 3 wherein storing the reduced host data includes:
writing the reduced host data from the data cache directly into the first storage tier of NVRAM when the write request identifies a synchronous host write operation; and
writing the reduced host data from the data cache directly into the second storage tier of SSD memory to circumvent the first storage tier when the write request identifies an asynchronous host write operation.

11. A method as in claim 3 wherein the reduced host data includes a set of compressed blocks generated by the data reducing ingest operation; and
wherein performing the late-binding operation further includes:
updating a mapping tree of the mapper to point to a set of locations within the second storage tier that contains the set of compressed blocks.

12. A method as in claim 3 wherein the reduced host data includes provisional deduplication metadata generated by the data reducing ingest operation, the provisional deduplication metadata identifying a set of blocks of raw host data that has been deduplicated; and
wherein performing the late-binding operation further includes:
updating mapper deduplication metadata based on the provisional deduplication metadata to enable the mapper to access the set of blocks of raw host data that has been deduplicated.

13. A method as in claim 3 wherein performing the late-binding operation further includes:
flushing a set of pages of the reduced host data from the first storage tier into the second storage tier.

14. A method as in claim 3 wherein performing the data reducing ingest operation includes:
storing the reduced host data in the first storage tier, the reduced host data being subsequently flushed from the first storage tier into the second storage tier during the late-binding operation; and
wherein the method further comprises:
placing other raw host data of another write request from the host into the data cache;
performing another data reducing ingest operation that reduces the other raw host data from the data cache into other reduced host data, the other reduced host data being stored directly into the second storage tier circumventing the first storage tier; and
after completion of the other data reducing ingest operation, performing another late-binding operation that updates the mapper with ability to access the other reduced host data from the second storage tier.

15. A method as in claim 3 wherein performing the data reducing ingest operation includes:
storing the reduced host data directly into the second storage tier circumventing the first storage tier; and
wherein the method further comprises:
placing other raw host data of another write request from the host into the data cache;
performing another data reducing ingest operation that reduces the other raw host data from the data cache into other reduced host data, the other reduced host data being stored in the first storage tier; and
after completion of the other data reducing ingest operation, performing another late-binding operation that subsequently flushes the other reduced host data from the first storage tier into the second storage tier and updates the mapper with ability to access the other reduced host data from the second storage tier.

16. A method as in claim 3, further comprising:
placing other raw host data of another write request from the host into the data cache;
transferring the other raw host data from the data cache into the first storage tier and acknowledging completion of the other write request to the host; and
performing a flushing operation that (i) reduces the other raw host data from the first storage tier into other reduced host data using a set of data reduction operations, (ii) stores the other reduced host data in the second storage tier, and (iii) updates the mapper with ability to access the other reduced host data from the second storage tier.

17. A method as in claim 1 wherein, after completion of the data reducing ingest operation, performing the late-binding operation includes:
writing the reduced host data from the data cache directly into the secondary storage circumventing a storage tier of non-volatile random access memory (NVRAM).

18. A method as in claim 1, further comprising:
prior to performing the data reducing ingest operation, performing a set of latency indication detection operations that detect the first latency indication of the first host write operation and the second latency indication of the second host write operation.

19. Data storage equipment, comprising:
memory; and
control circuitry coupled to the memory, the memory storing instructions which, when carried out by the control circuitry, cause the control circuitry to perform a method of:

placing raw host data of the set of write requests from the host into a data cache, performing a data reducing ingest operation that reduces the raw host data from the data cache into reduced host data, and after completion of the data reducing ingest operation, performing a late-binding operation that updates a mapper with ability to access the reduced host data from secondary storage:

wherein the raw host data includes first host data from a first host write operation and second host data from a second host write operation; and wherein performing the data reducing ingest operation includes:

reducing the first host data into first reduced data based on a first latency indication of the first host write operation indicating that the first host write operation is not latency sensitive, and storing the first reduced data in a logger of the data storage equipment, and not reducing the second host data based on a second latency indication of the second host write operation indicating that the second host write operation is latency sensitive, and storing the second host data that is not reduced based on the second latency indication in the logger of the data storage equipment.

20. A computer program product having a non-transitory computer readable medium which stores a set of instructions to process a write request from a host; the set of instructions, when carried out by computerized circuitry, causing the computerized circuitry to perform a method of:

placing raw host data of the set of write requests from the host into a data cache;

performing a data reducing ingest operation that reduces the raw host data from the data cache into reduced host data; and after completion of the data reducing ingest operation, performing a late-binding operation that updates a mapper with ability to access the reduced host data from secondary storage;

wherein, after completion of the data reducing ingest operation, performing the late-binding operation includes:

writing the reduced host data from the data cache directly into the secondary storage circumventing a storage tier of non-volatile random access memory (NVRAM).

* * * * *